US006529518B1

(12) United States Patent
Webber

(10) Patent No.: US 6,529,518 B1
(45) Date of Patent: Mar. 4, 2003

(54) METHOD AND APPARATUS FOR PROVIDING A NETWORK INTERFACE

(75) Inventor: Thomas P. Webber, Petersham, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/096,450

(22) Filed: Jun. 11, 1998

(51) Int. Cl.$^7$ .......................... H04J 3/22; H04L 12/42; H04L 12/56
(52) U.S. Cl. ........................................ 370/403; 370/258
(58) Field of Search .................. 370/403, 406, 370/412, 413, 424, 429, 452, 454, 254, 258, 401, 465; 709/201, 203, 211, 229, 311

(56) References Cited

U.S. PATENT DOCUMENTS

| | | | | |
|---|---|---|---|---|
| 4,597,077 A | * | 6/1986 | Nelson et al. ................ | 370/88 |
| 4,674,085 A | | 6/1987 | Aranguren et al. | |
| 4,726,018 A | * | 2/1988 | Bux et al. ...................... | 370/89 |
| 4,866,704 A | * | 9/1989 | Bergman .................. | 370/85.4 |
| 5,043,981 A | * | 8/1991 | Firoozmand et al. ...... | 370/85.1 |
| 5,051,985 A | * | 9/1991 | Cidon et al. ........... | 370/85.005 |
| 5,491,686 A | | 2/1996 | Sato | |
| 5,493,566 A | | 2/1996 | Ljungberg et al. | |
| 5,613,073 A | * | 3/1997 | Hammond, Jr. et al. .... | 395/250 |
| 5,647,056 A | | 7/1997 | Barrett et al. | |
| 5,687,316 A | * | 11/1997 | Graziano et al. ........ | 395/200.2 |
| 5,905,870 A | | 5/1999 | Mangin et al. | |

FOREIGN PATENT DOCUMENTS

| EP | 0 392 173 A2 | 10/1990 |
|---|---|---|
| EP | 0 561 381 A2 | 9/1993 |

OTHER PUBLICATIONS

Loo, Bill Van, et al., "SerialExpress—A Scalable Gigabit Extension to Serial Bus", IEEE Standard Draft .781, Apr. 12, 1997, pp. 1–356, especially pp. 1–8, 109–136, New York, New York.

Peterson, Larry L., et al., "Computer Networks, A Systems Approach", 1996, pp. 130–132, Morgan Kaufmann Publishers, Inc., San Francisco, California, US.

* cited by examiner

Primary Examiner—Alpus H. Hsu
Assistant Examiner—Toan Nguyen
(74) Attorney, Agent, or Firm—Kudirka & Jobse, LLP

(57) ABSTRACT

A network adapter includes a bypass buffer with sufficient capacity to store a packet from an upstream neighboring adapter and to store at least one additional incoming packet as a local packet is sent. The adapter also includes control logic which monitors the bypass buffer to determine whether the adapter may send local data packets. A network may be formed of such network adapters linked through counterrotating rings. If the control logic determines that the bypass buffer has sufficient storage available to avoid overflow while the adapter sends the local packet, the adapter sends the local packet. The control logic may choose to send a local packet only if there is sufficient room available within the bypass buffer to store a packet the same size as the local packet which is to be sent, thereby insuring that the bypass buffer does not overflow before the adapter can resume transmitting data from the bypass buffer. If there is not sufficient room within the adapter's bypass buffer, the adapter requests a pause in transmissions from its upstream neighbor which pause will permit the adapter to empty its bypass buffer and to then send a local packet. If the upstream neighbor cannot accommodate the pause request, it, in turn, requests a pause from its own upstream neighboring adapter, and so on, until a pause is effected and the original pause-requesting adapter can empty its bypass buffer and transmit its local packet.

29 Claims, 8 Drawing Sheets

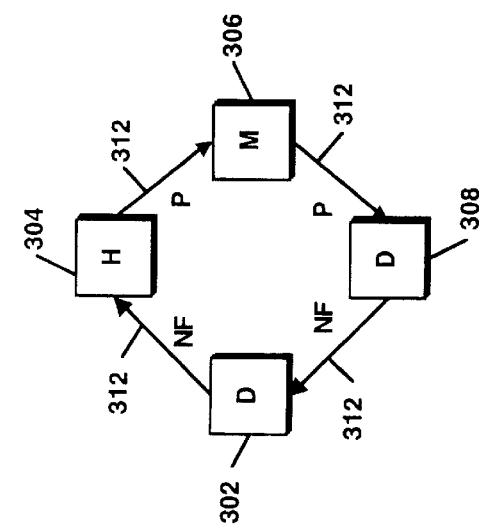
*Figure 7C*
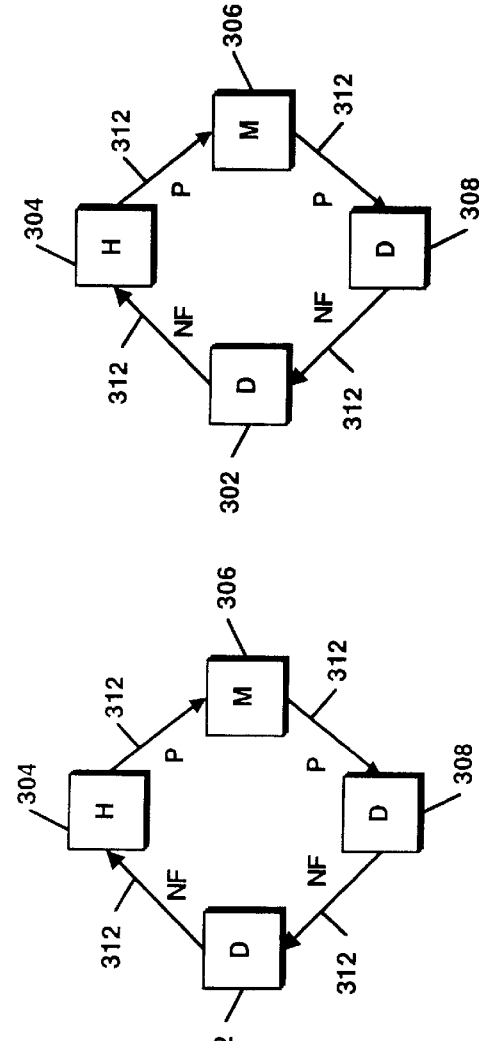
*Figure 7B*
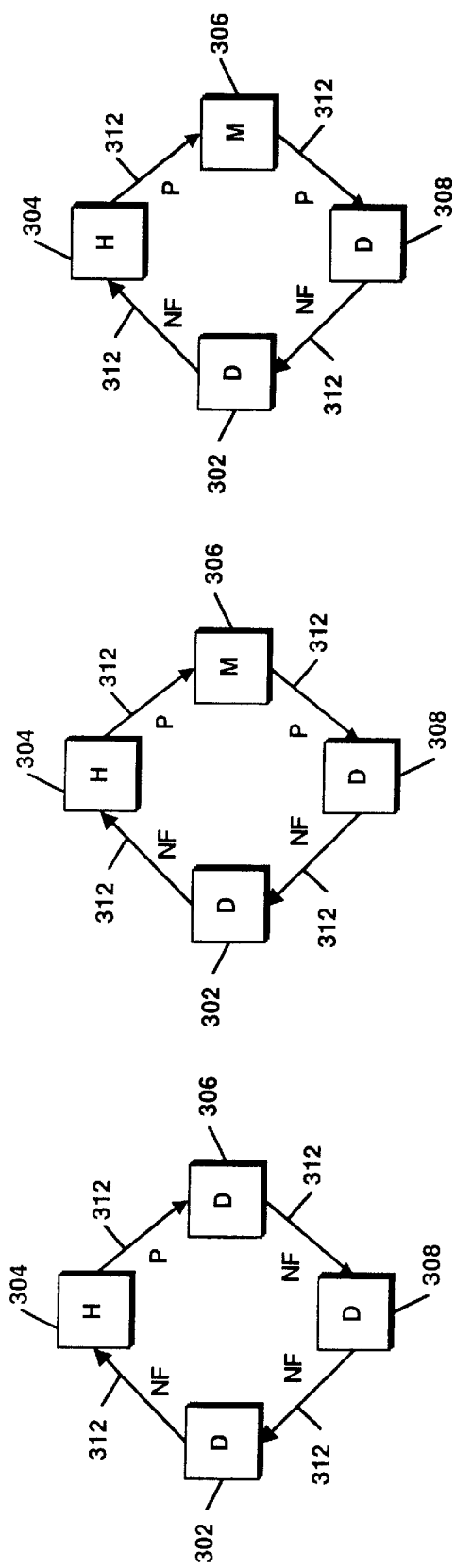
*Figure 7A*
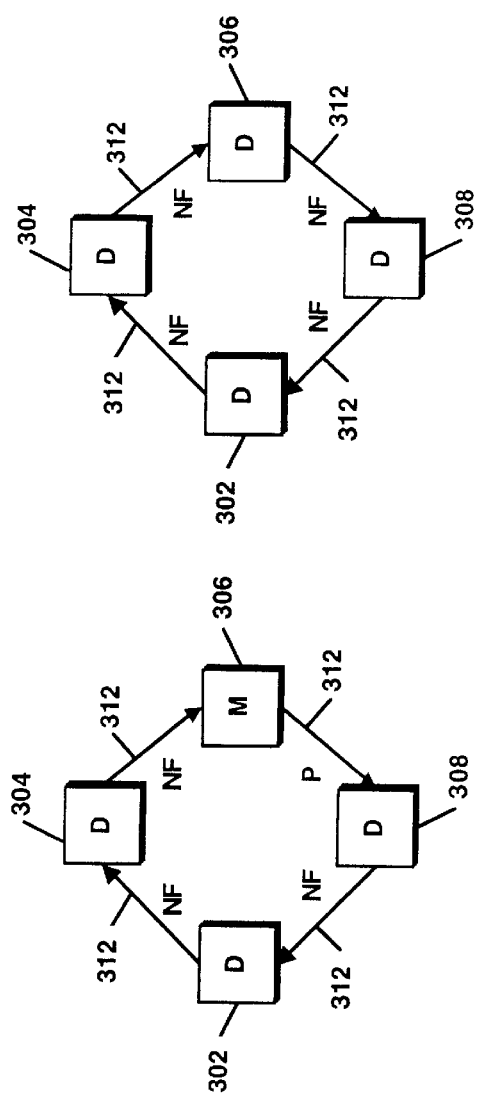
*Figure 7E*
*Figure 7D*

METHOD AND APPARATUS FOR PROVIDING A NETWORK INTERFACE

FIELD OF THE INVENTION

The invention relates to data communication networks and, in particular, to methods and apparatus for accessing data networks.

BACKGROUND OF THE INVENTION

Numerous computer networking schemes have been employed for some time, with varied success. For example, a carrier send multiple access/collision detection (CSMA/CD) network such as the Ethernet sends messages and packets with a preamble and error checking. To gain access to the network, a sender waits until there is no activity on the network, begins to send the message and at the same time checks for interference. As long as there is no interference the sender continues to send the message. However, if the sender detects interference, the sender jams the network, aborts its transmission and waits a random amount of time before re-sending. Each Ethernet message is organized into packets which include a header that identifies the recipient and sender, a preamble indicating the packet's length, type and sequence number, followed by the actual data, and, finally, a cyclical redundancy check sum (CRC) which the recipient can employ to verify error-free operation. Repeated collisions and retries associated with heavy traffic on an Ethernet network may lead to substantial delays in the delivery of messages.

A token ring network employs a closed set of nodes organized in a ring topology. A device connected to the ring may send along the network only if it has possession of the token. The token is typically a short message that is passed around a ring until a device that wishes to transmit extracts the token from the ring. When the sender is finished sending its message, which may be many packets long, the sender releases the token and sends it around the ring. Then another device which needs to send data along the ring may acquire the token and commence sending. Unfortunately, a node may hold the token for an extended period of time, thereby blocking access to the network.

More recently, alternative networks have been developed which are based on protocols such as the IEEE "serial express" standard. P2100, Draft 0.781 of the standard is hereby incorporated by reference and may be obtained from the IEEE at the following address: IEEE Standards Department Copyright and Permissions 445 Hoes Lane, P.O. Box 1331, Piscataway, N.J. 08855-1331. Serial Express specifies a high speed interconnect design for use with high speed device, including video cameras, monitors, serial bus bridges, PCI-card chassis, high performance I/O devices, and for low cost group clustering. Serial express employs low cost serial link technology that can operate at rates of 1 gigabit per second, provides for variable length data packets, and permits bidirectional operation. Such high data rates provide high bandwidth, low latency access to workstation/personal computer memory systems and high bandwidth input/output for high performance disk subsystems, for example.

Access to such a network should be simple, efficient and fair. An arbitration system that provides access to the network should be simple in order to avoid implementation errors and to avoid complex testing procedures. In order to provide the maximum benefit of the network system, an arbitration mechanism should be efficient. That is, gaining access to the network should not require a complex series of steps that consume a great deal of time, thereby reducing the throughput of the network. The arbitration mechanism should also allow every device connected to the network to access the network. That is, no device connected to the network should be permitted to dominate the network by continually sending and thus preventing other devices connected to the network from obtaining access. There is a need, therefore, for network access devices and methods which provide simple, efficient and fair access to such a network.

SUMMARY OF THE INVENTION

In accordance with the principles of the invention, each network interface unit, or network adapter, connected to the network includes a bypass buffer, generally organized as a first in first out (FIFO), which buffers packets that pass through the network and are directed to downstream adapters. In order to provide fair, efficient access to the network for every device connected to the network through a network adapter, each network adapter operates in one of four modes: as a "sender", a "fused bypass head", a "donor", or a "fused bypass member". The adapter's operating mode depends upon whether the adapter has packets to send from the device which the adapter connects to the network, upon whether another adapter has requested that the adapter suspend its transmission of packets, and upon whether the adapter has sufficient room within its bypass buffer.

Each adapter has the ability to request a pause in transmission from its upstream neighboring network adapter. If an adapter has received such a pause request, the adapter may operate as a donor, as a member, or as a head. If an adapter has not received a pause request, it may operate as a sender or as a head.

Whenever an adapter is to transmit a local packet, i.e., a packet generated by the device which the adapter connects to the network, onto the network, and the adapter has not received a pause request, the adapter may operate as a sender. As a sender, the adapter first examines its bypass buffer and, if there is sufficient room in its bypass buffer to ensure that no overflows will occur, the adapter transmits its local packet onto the network. That is, the adapter will transmit the local packet if there is room available within its bypass buffer to store whatever bypass packets may arrive during the time the local packet is being transmitted. In an illustrative embodiment the adapter includes a bypass buffer that is at least twice as "long" as the longest packet supported by the network. Since bypass packets arrive at the same rate that local packets are sent, the bypass buffer will not overflow so long as the local packet to be sent would fit within the space available within the bypass buffer. Consequently, in an illustrative embodiment, an adapter acting as a sender transmits a local packet if there is enough room available within the adapter's bypass buffer to store a packet as long as the local packet.

If there is not enough room within the adapter's bypass buffer to permit the transmission of a local packet, the adapter attempts to limit the number of packets being transmitted to it by sending a request to its nearest upstream neighboring adapter, that is, to the adapter from which it most directly receives packets, to suspend the transmission of packets. In response to this request for, or assertion of, "pause", the upstream adapter will suspend the transmission of data packets as soon as it completes the transmission of any packet it may be in the process of sending if the upstream adapter is able to suspend its transmission of packets. Instead of transmitting data packets, the upstream adapter will send "IDLE" packets, i.e., relatively short packets that contain status information. An IDLE packet is discarded by an adapter which receives one. While receiving IDLE packets, the downstream adapter continues to transmit one or more data packets from its bypass buffer, thereby "draining" its bypass buffer. When the downstream adapter's bypass buffer is emptied, the downstream adapter sends a local packet and de-asserts the pause request it had made to its upstream neighbor.

In some circumstances an upstream adapter should not pause in response to a pause request. For example, if the upstream adapter's own bypass buffer is full, it would run the risk of overflowing its own bypass buffer if it stopped transmitting packets from its bypass buffer and transmitted IDLE packets to its downstream, pauserequesting, neighbor. In such a case, the upstream adapter asserts pause to its own upstream neighbor which suspends the transmission of data packets and transmits IDLE packets in response, if its own bypass buffer is not full. The intermediate adapter continues to transmit data packets from its own bypass buffer until it's bypass buffer is empty. The process may be repeated until an upstream adapter is reached which can send IDLE packets. In this manner a chain of adapters is formed, all of which are asserting pause to their upstream neighbors in a chain. The bypass buffers, or FIFOs, appear to be fused together. The intermediate adapter empties its bypass buffer, then sends IDLE packets to the original pause-requesting adapter, thus permitting that adapter to empty its bypass buffer, send its local data packet and de-assert its pause request. Subsequently, the upstream adapters may de-assert their pause requests.

The original pause-requesting adapter in the thus-formed chain of adapters will be referred to hereinafter as the "head" of a "fused bypass". An intermediate adapter, one which is unable to suspend its transmission of bypass packets in response to a request for a pause by a fused bypass head and which itself requests a pause from its upstream neighbor, will be referred to as a fused bypass "member". An adapter which suspends its transmission of all packets other than IDLE packets in response to a request for a pause from a downstream packet will be referred to, generally, as a "donor". If the donor adapter is the last adapter in the fused bypass it is referred to as the "tail" of the fused bypass. A plurality of fused bypasses may form within the network at any given time and the tail of a given fused bypass may extend upstream from an existing fused bypass by the addition to the fused bypass of network adapters.

In an illustrative embodiment, a network adapter in accordance with the principles of the invention includes two sets of unidirectional, input and output ports, control logic, and a bypass buffer. The input and output ports for one direction of data transmission are employed, primarily, to send/receive data and the input and output ports for the other direction are employed, primarily, to send/receive network access arbitration information. In an associated network, data is transmitted around the network in one direction along one ring and arbitration, or control/status, information is transmitted around the network in the opposite direction around the other ring.

From the perspective of the data input port, the control logic examines packets received at the data input port and strips the packet from the data stream if the packet is directed to the particular network adapter or it's associated device. If the packet is not directed to the particular adapter, the packet is placed in the bypass buffer, which is, illustratively, at least twice the length of the largest packet permitted on the network.

From the perspective of the data output port, the control logic controls access to the network through the data output port by routing packets from either the bypass buffer or from the device attached to the network through the network adapter. IDLE packets, that is, short packets containing no data, are also routed to the data output port and may be generated, illustratively, by the control logic. If an adapter has a local packet to send, that is, if the adapter has a packet generated by the device which the adapter connects to the network to send, the adapter examines its bypass buffer and only sends the local packet if there is sufficient room in its bypass buffer to insure that no bypass packets will be dropped.

BRIEF DESCRIPTION OF THE DRAWINGS

The above and further advantages of the invention may be better understood by referring to the following description in conjunction with the accompanying drawings in which:

FIGS. 7A through 7E are conceptual block diagrams which illustrate a sequence of operations which permit a network adapter to send a local packet by inducing upstream network adapters to suspend the transmission of packets.

DETAILED DESCRIPTION OF THE PREFERRED EMBODIMENT

Figure 1:
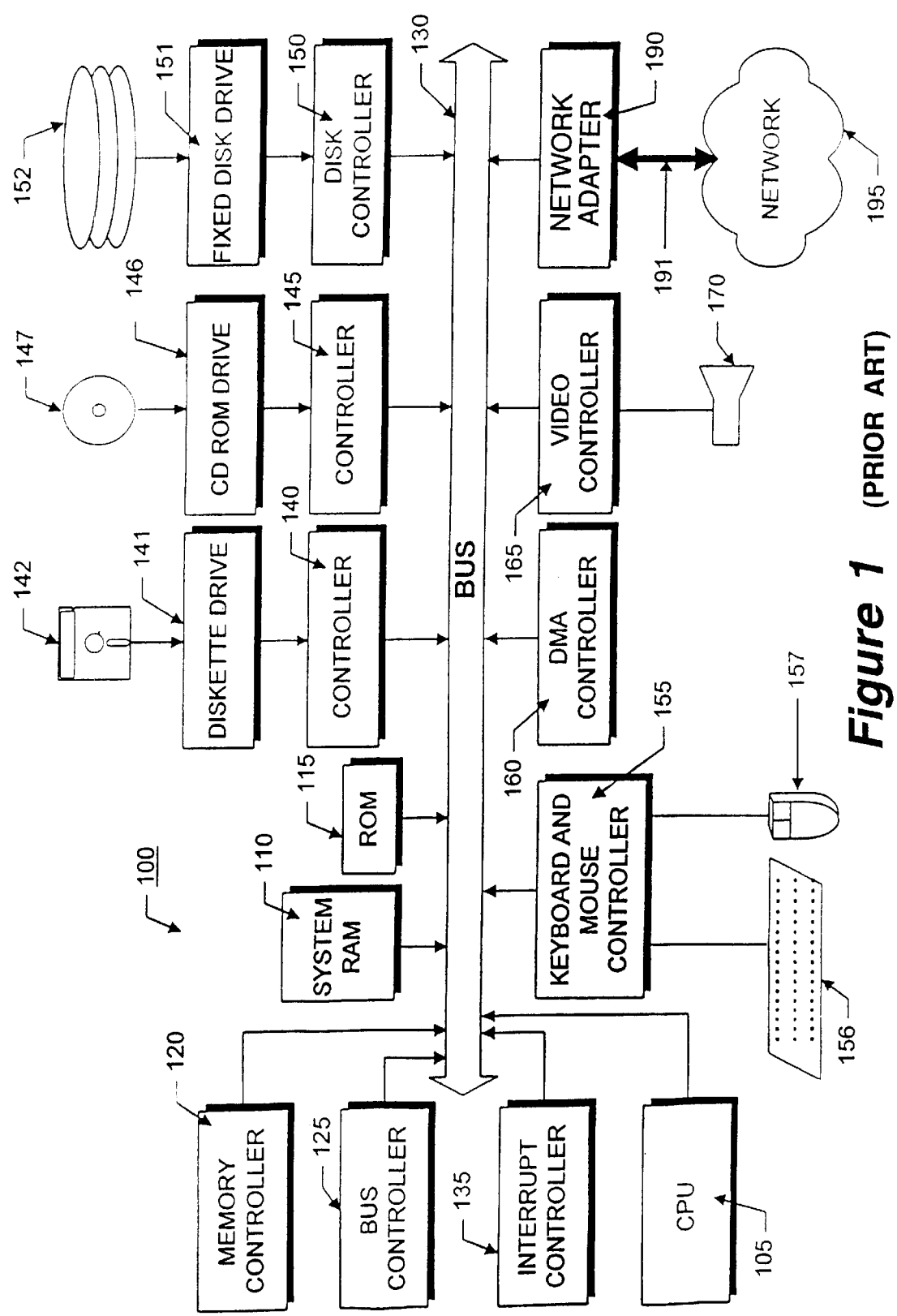
FIG. 1 is a schematic block diagram of a prior art hardware platform which forms part of a computer system that may incorporate elements of the invention.

FIG. 1 illustrates the system architecture for an exemplary client computer 100, such as an IBM THINKPAD 701® computer or Digital Equipment Corporation HiNote™ computer, or Sun SPARCStation on which the disclosed network access system (system) can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The client computer 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152. Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the client computer 100 may be provided by a number of devices. For example, a keyboard 156 and a mouse 157 may be connected to bus 130 by keyboard and mouse controller 155. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Client computer 100 also includes a network adapter 190 that allows the client computer 100 to be interconnected to a network 195 via a bus 191. The network 195, which may be a local area network (LAN), a wide area network (WAN), or the Internet, may utilize general purpose communication lines that interconnect multiple network devices.

Client computer system 100 generally is controlled and coordinated by operating system software, such as the WINDOWS 95® operating system (available from Microsoft Corp., Redmond, Wash.). Among other computer system control functions, the operating system controls allocation of system resources and performs tasks such as process scheduling, memory management, networking and I/O services.

Figure 2:
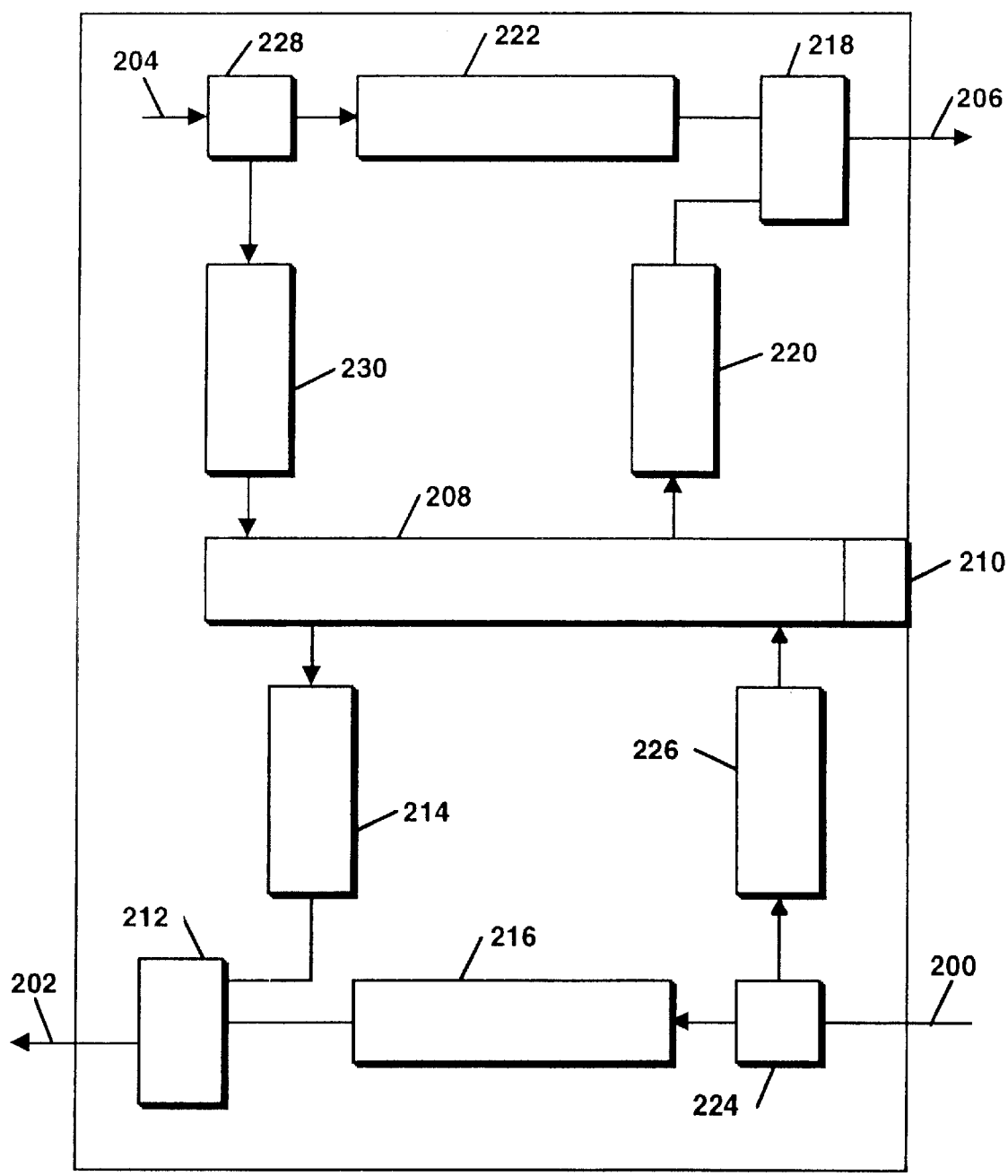
FIG. 2 is a conceptual block diagram of a network adapter in accordance with the principles of the present invention.

In FIG. 2 a communication adapter 190 is illustrated as a functional level block diagram. The communication adapter 190 includes an input port 200, an output port 202 and, for packet transmission in the opposite direction, an input port 204, and an output port 206. The communication adapter includes control logic 208 which controls the stripping of packets from the network input ports 200 and 204 and sending of packets to output ports 202 and 206. Control logic 208 also permits the attachment of the communication adapter 190 to the bus 130 through the attachment block 210 and the transfer of data packets to and from the attachment blocks 210. The control logic 208 may be implemented in a variety of ways, including application specific integrated circuitry, a microcontroller, microprocessor, etc. and, illustratively, includes memory.

The output port 202 receives data packets from a multiplexer 212 which, in turn, receives data packets from either a bypass buffer 216 or a send or local packet buffer 214 under control of control of logic 208. Similarly, the output port 206 receives data packets from a multiplexer 218 which, in turn, receives data packets from either a bypass buffer 222 or a send buffer 220 again, under control of the control logic 208. Packets received at the input 200 are routed to the demultiplexer 224 and, under control of the control logic 208, either stripped and sent to the receive buffer 226 or passed through to the bypass buffer 216. Similarly, packets received at the input port 204 are received at a demultiplexer 228 and under control of the control logic 208 either stripped and sent to the receive buffer 230 or passed through to the bypass buffer 222.

Illustratively, each of the bypass buffers 216 and 222 is organized as a FIFO, which may be implemented, for example, with a shift register or linked list of memory locations. Additionally, the bypass buffers 216 and 222 are each at least twice as deep as the longest packet transmitted along the network. That is, if the longest packet transmitted along the network to which input and output ports 200 and 202, respectively is 88 bytes long, the buffer 216 is at least 176 locations deep. With a bypass buffer of this depth, the communication adapter 190 may begin to send a packet from the send buffer 214 at the same time it is receiving a packet at input port 200 even if the bypass buffer 216 is half full. By the time the packet from the send buffer 214 has been sent, the bypass buffer 216 will be full and a control logic 208 will then transmit the contents of the bypass buffer 216 through the multiplexer 212 to the output port 202.

Figure 3:
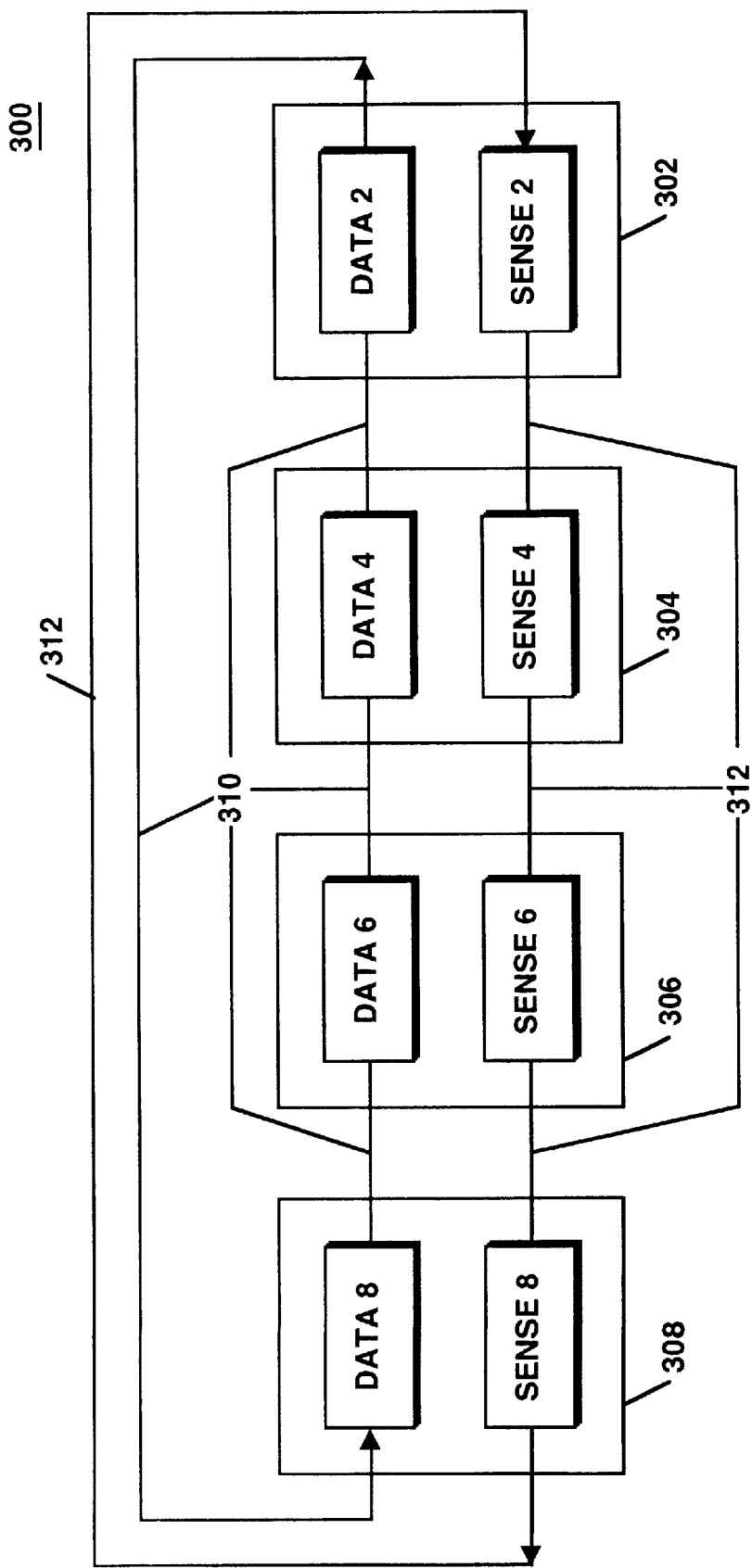
FIG. 3 is a conceptual block diagram of a dual counter-rotating ring network in accordance with the principles of the present invention.

A network of counter rotating rings in accordance with the principle of the present invention is illustrated in FIG. 3. The network 300 includes communication adapters 302, 304, 306 and 308 which are equivalent to the communications adapter 190 described in relation to FIG. 2. Communication adapters 302 through 308 would be connected through attachments 210 to workstations, video sources, or similar devices, as illustrated in FIG. 1. The topology of the counter rotating ring network 300 employs one ring, including data transmission path 310, for data transmission and the other ring, including its transmission path 312, as a sense or control path. The sense path is employed, as will be discussed in greater detail in relation to FIG. 6, to control the flow of data around the data path 310.

Figure 4:
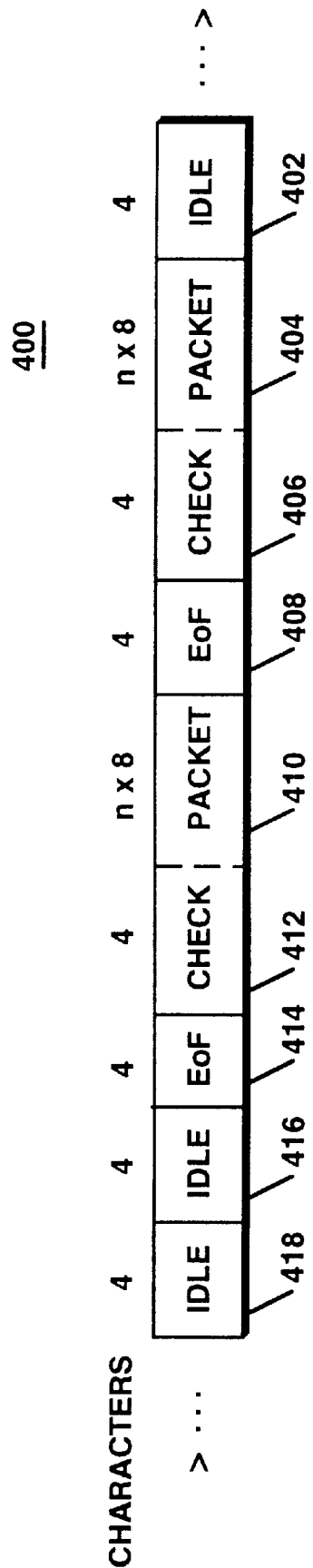
FIG. 4 is a block diagram which illustrates the general organization of a sequence of data packets transmitted over the inventive network.

Turning now to FIG. 4, a snapshot of traffic along the data communication path 310 is illustrated. An IDLE packet 402 consists of four bytes of information which may include status flags and other information. The IDLE packet 402 is followed by a data packet 404 which, in the illustrative embodiment is no more than 88 bytes long. The data packet 404 is followed by a check sum 406 and an end of frame field 408, which is four bytes long and marks the end of the packet 404. Another data packet 410 follows the end of frame field 408 and the packet 410 is, in turn, followed by a check sum 412 and end of frame field 414. Idle packets 416 and 418 may follow the end of frame field 414. The end of frame symbols 414 and 408 are nondeletable symbols sent after each packet which provide packet framing. Additional, deletable, idle packets may be inserted to fill the space between infrequently sent packets. Within the packet data bytes are included as ten bit characters.

As noted above, each communication adapter has send buffers, strip buffers, and a bypass buffer. Packets may pass through the adapter or may be stripped. When a packet is stripped, it is placed in the input buffer and IDLE packets such as symbol 418 are discarded. The pass/strip decision is based on comparing the identifier stored within the control logic 208 to identifiers and command codes within the first four byte header of each packet. Control logic 208 also creates packets and places them within the send buffers. IDLE packets are discarded as they are received.

Figure 5:
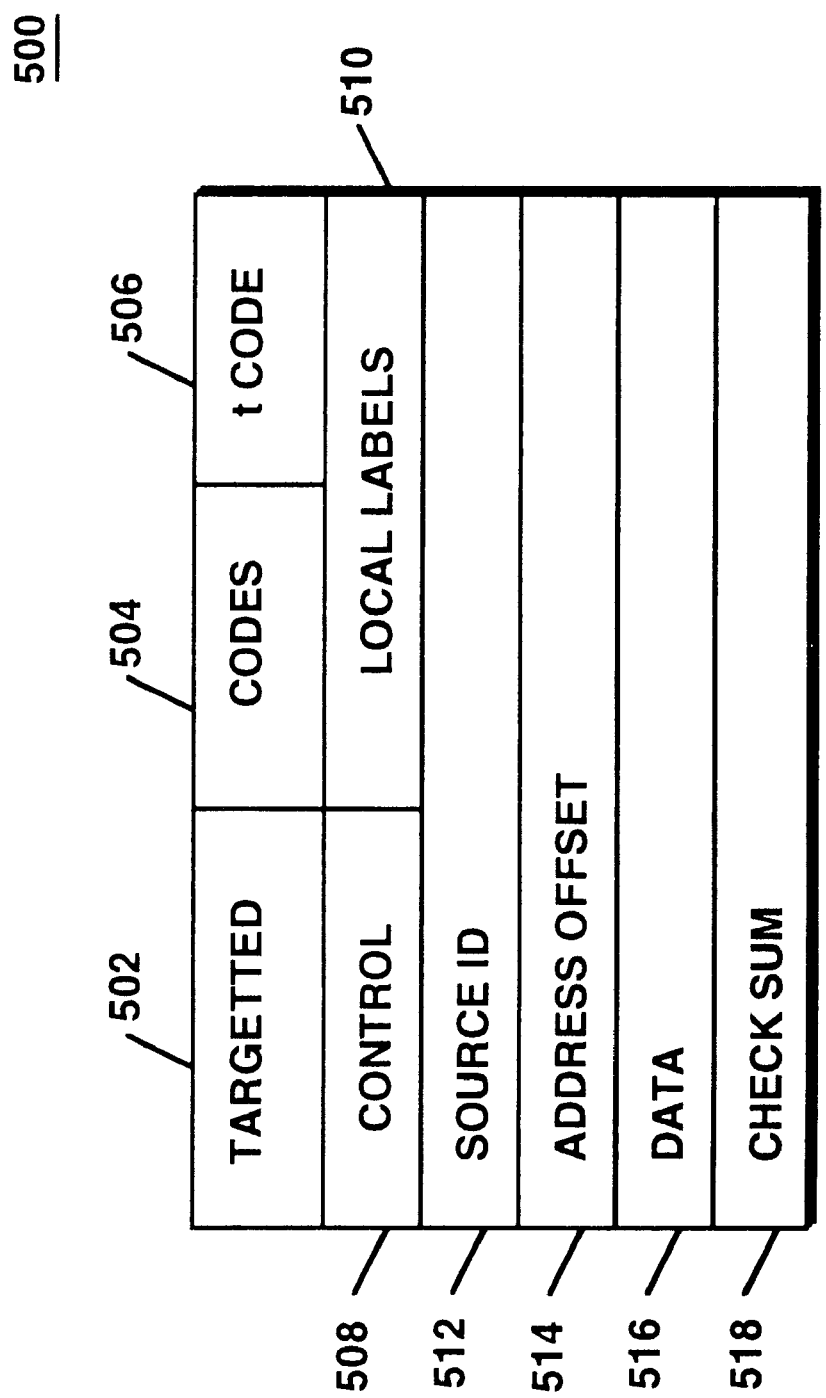
FIG. 5 is a detailed block diagram of the fields which comprise an illustrative direct a synchronous data packet in accordance with the principles of the present invention.

The counter-rotating rings of the illustrative network embodiment employ directed asynchronous communication and the packet format for such communications is illustrated in FIG. 5. A packet 500 in accordance with the illustrative embodiment begins with a target ID 502 which specifies which adapter is to strip the packet. Following the target ID field 502, a code field 504 and time code field 506 provide transaction command code and transaction command code modifiers such as speed indications and time between send and acknowledge packets. The control field 508 provides, inter alia, diagnostic information. A local label field 510 provides producer/consumer accounting information so that acknowledge packets, which return portions of these labels, can be affiliated with the proper send packets. The source ID field 512 associates the adapter which sends the packet with the packet. The address offset field 514 may be used to specify a specific location to be accessed within a node to which the adapter is attached. The data field 516 holds the packets of data and the check sum field 518 provides a cyclical redundancy check for the packet.

The arbitration policy employed within the illustrative embodiments of the invention allows an adapter to send a local packet so long as there is sufficient room within its bypass buffer for any packet that may arrive while the local packet is being sent. If an adapter's bypass buffer is empty and it's associated node wishes to send, the adapter's control logic 208 may route the contents of the send buffer 220 through the multiplexer 218 to the output port 206. Assuming bypass packets and local packets may be sent at the same rate, the requirement for sufficient capacity within the bypass buffer to hold incoming bypass packets while the local packet is being sent is equivalent to permitting transmission of the local packet only if the bypass buffer has at least enough capacity remaining at a packet boundary to store a packet as long as the local packet. In this way, even if the bypass buffer receives a bypass packet or packets the entire time the local packet is being sent, the bypass buffer will not overflow.

For the following discussion, it is assumed that transmission rates for local and bypass through packets are identical and that, consequently, a local packet may be sent so long as there is sufficient available capacity with the bypass buffer at a packet boundary to store a packet as long as the local packet to be sent. However, in general, transmission rates for bypass and local packets need not be identical and the available capacity within the bypass buffer may be adjusted accordingly.

If an adapter cannot send a local packet because there is insufficient available capacity within the adapter's bypass buffer, the adapter sends a specially formatted IDLE packet, one with a flag set to request a pause, along the sense loop to the adjacent upstream adapter. That is, the pause request packet is sent to the adapter from which the requesting adapter receives data packets. An IDLE packet containing the pause request flag will be referred to hereinafter as a pause packet. Additionally, the adapter requesting the pause, illustratively, continue to periodically send pause packets until its status changes, and it no longer requires the upstream adapter to pause from sending data packets.

In response to the reception of a pause request, the upstream adapter is expected to stop sending data packets from its send or bypass buffer as soon as any packet transmission in progress is completed and to then send IDLE packets instead to the downstream requesting adapter. The requesting adapter discards the IDLE packets and may send packets from its bypass buffer, thereby "draining" the contents of its bypass buffer. When its bypass buffer has been sufficiently emptied, the requesting adapter sends a packet from its send buffer then de-asserts the pause request by sending an IDLE packet with the pause flag de-asserted to its immediately upstream adapter through the sense ring.

Figure 6C:
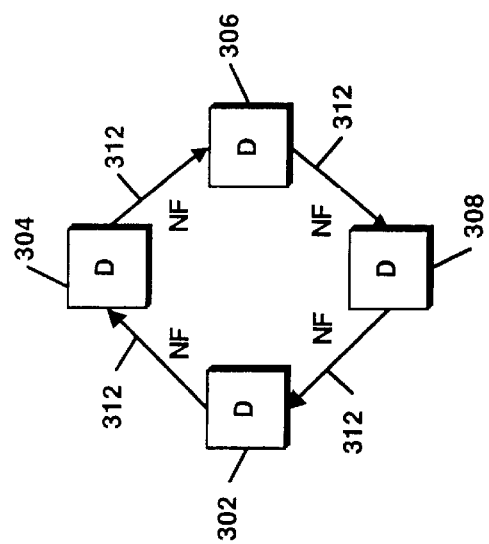
FIGS. 6A through 6C are conceptual block diagrams which illustrate a sequence of operation for four network adapters as they cooperate to transmit data packets along the network in accordance with the principles of the present invention.
Figure 6B:
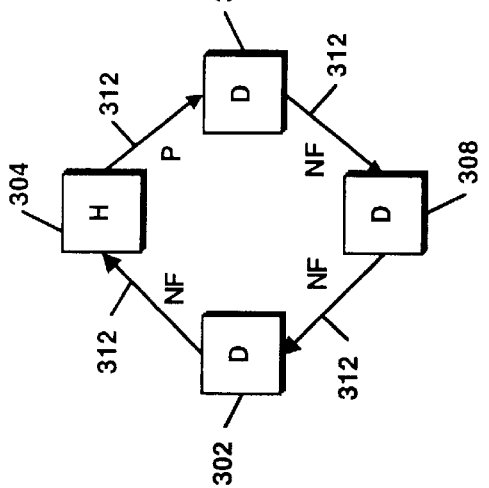
Figure 6A:
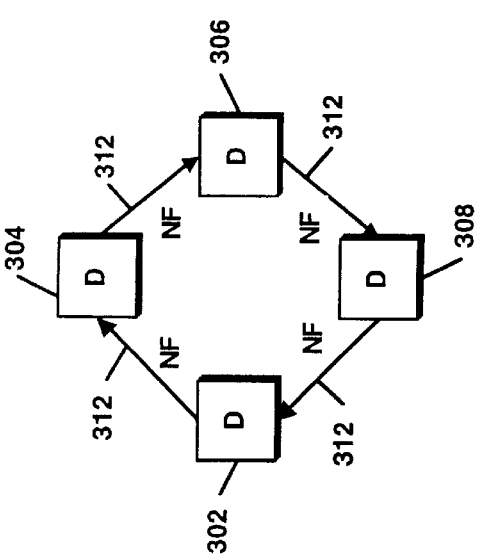

The above scenario is illustrated in the conceptual block diagrams of FIGS. 6A–C. In FIG. 6A–6C, the adapters 302–308 are as described in relation to FIG. 3. However, only one of the counter-rotating rings, the sense ring 312, is illustrated in these figures.

In FIG. 6A, all the adapters are capable of sending packets from their respective send buffers. That is, the adapters' respective bypass buffers have enough available capacity to accommodate a packet the size of the next packet waiting to be sent from the adapter's send buffer. Since all the adapters have available capacity within their respective bypass buffers, they all could "donate" buffer space to their downstream neighbors by holding the contents of their bypass buffer and sending IDLE packets downstream. Consequently, the adapters are referred to as donors and are labeled with a D to indicate their donor status. Additionally, each leg of the sense link 312 is labeled NF to indicate that no flag, specifically, no assertion of the pause flag within an IDLE packet, is being sent upstream.

In FIG. 6B, adapter 304 cannot send packets from its send buffer to its downstream neighbor, adapter 302, because its bypass buffer is too full. Consequently, the adapter 304 sends a pause packet to its upstream neighbor 306, as indicated by the P label on the leg of the sense ring 312 between adapters 304 and 306. As previously indicated, the pause packet will induce the adapter 306 to cease sending data packets from its send or bypass buffer, for example, and commence sending IDLE packets. The requesting adapter 304, referred to as a "head" and, accordingly, labeled H, takes advantage of the IDLE packets it receives from the upstream adapter 306 to create additional available space within its own bypass buffer by continuing to send data packets from its own bypass buffer. When sufficient space is available within the bypass buffer of the adapter 304, that is, when, after the transmission of a complete packet, the bypass buffer is empty, the adapter 304 sends a packet from its send buffer. After sending a packet from its send buffer, the adapter 304, as illustrated in FIG. 6C, deasserts the pause request by sending to the upstream adapter 306 an IDLE packet with no flags set. Coincident with de-asserting the pause request, the status of adapter 304 reverts from that of a head to a donor, as indicated by the D label within the adapter 304 in FIG. 6C.

As previously mentioned, whenever an adapter receives a pause request, so long as it has sufficient available capacity within its own bypass buffer, it stops sending data packets to the downstream, pause requesting, adapter as soon as it finishes sending any data packet that it may be in the process of sending. Then, the adapter receiving the pause request sends IDLE packets downstream. If the upstream packet does not have sufficient available capacity within its own bypass buffer, it generates a pause request for its own upstream neighbor. Note that the measure of "sufficient capacity" within the bypass buffer is different in this case, wherein an adapter receives a pause request, from the measure of sufficient capacity used when an adapter determines whether there is sufficient available capacity within the bypass buffer to permit sending. In the illustrative embodiment, the control logic 208 within each adapter monitors the bypass buffers and provides an indication of whether each buffer is "empty" or "full". To insure that an adapter does not risk overflowing its own bypass buffer, the control logic indicates that the bypass buffer is "full" even before every location within the adapter's bypass buffer is filled. In the illustrative embodiment for example, whenever the bypass buffer is filled to three quarters of capacity, the control logic 304 treats the bypass buffer as full, for the purpose of sending a pause request upstream in response to the reception of a pause request. That is, whenever a donor adapter is in the process of sending IDLE packets downstream and detects that its own bypass buffer is filled to three quarters of capacity, it generates a pause request for its own upstream neighbor adapter. The level at which this decision is made is chosen to insure that the bypass buffer does not overflow, but, at the same time, it permits the bypass buffer to fill as much as possible in order to provide as many IDLE packets as possible to the downstream, requesting adapter.

Once the bypass buffer has been "fused", that is, once an upstream adapter sends IDLE packets downstream in response to a request from the downstream adapter and the upstream adapter requests IDLE packets from its own upstream neighbor, the bypass buffers remain fused in this manner until the first requesting adapter's bypass buffer empties and it sends a packet from its send buffer. In order to maximize network utilization, the first requesting adapter may de-assert its pause request when its bypass buffer reaches a threshold level, such as one quarter full, rather than waiting until its bypass buffer is completely emptied.

As illustrated by the conceptual block diagrams of FIGS. 7A–7E, any number of adapters along a network may join a "fused bypass". In FIG. 7A, adapter 304 has become head of a fused bypass by sending an IDLE packet with the pause bits set. This is indicated in FIG. 7A by the P label along the sense link 312 between adapter 304 and adapter 306. At some point, illustrated in FIG. 7B, the adapter 306 is unable to send IDLE packets to the adapter 304 because its own bypass buffer is filled to a level that will not accommodate another data packet and, therefore, the adapter 306 sends a pause request to its upstream neighbor, the adapter 308. In this way, the adapter 306 becomes "a member" of a fused bypass, indicated by the M label within the block 306. In FIG. 7C, the fused bypass buffer is maintained and the adapter 308 sends IDLE packets to the adapter 306, which sends IDLE packets to the adapter 304 as soon as the adapter 306 empties its own bypass buffer of the data packets which have prevented the adapter 306 from sending IDLE packets to the adapter 304. The adapter 306 begins sending IDLE packets as soon as its buffer empties. The adapter 304 continues to send data packets from its bypass buffer and, upon receiving the IDLE packets from the adapter 306, the adapter 304 proceeds to empty its bypass buffer.

When its buffer is empty and it has sent a packet from its send buffer, the adapter 304 deasserts the pause request by sending an IDLE packet with the pause bit de-asserted, as indicated in FIG. 7D. The adapter 304 changes status from head of a fuse bypass buffer to donor by deasserting the pause request in this manner. When the adapter 306 receives the IDLE packet deasserting the pause request, it too deasserts its own pause request, as illustrated in FIG. 7E, by sending an IDLE packet 10 with the pause flag deasserted to the adapter 308. Because the bypass buffer of the adapter 306 would have emptied before the adapter 306 sent any IDLE packets to the adapter 304, the adapter 306 is ready to de-assert its pause request to the adapter 308 as soon as the adapter 304 deasserts its pause request.

Figure 8:
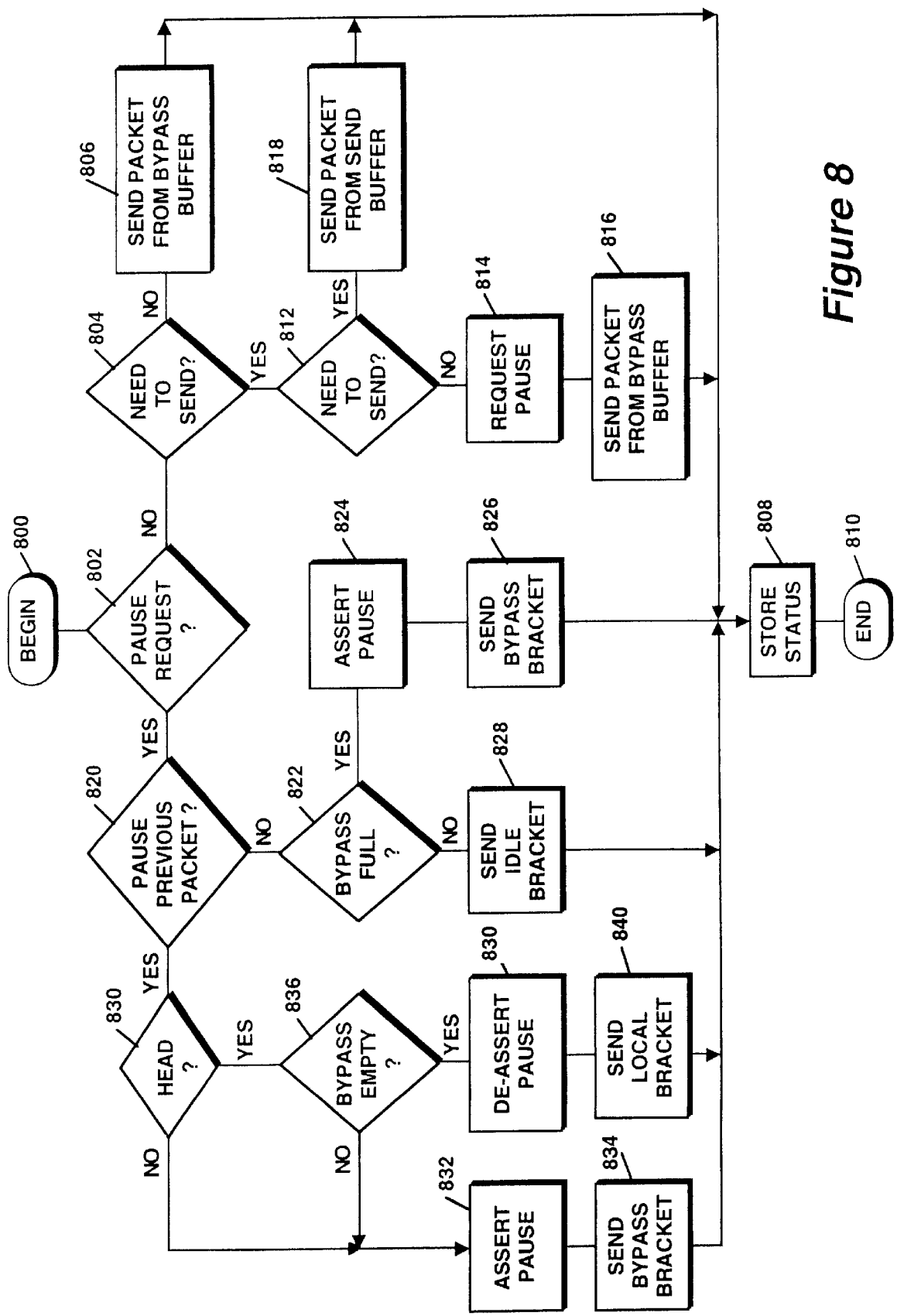
FIG. 8 is a flowchart which illustrates the operation of a network adapter in accordance with the principles of the present invention.

Turning now to the flow chart of FIG. 8, the process of sending a packet in accordance with the principles of the present invention is set forth. The process of sending a begins in step 800 after the adapter with which the flowchart is associated has sent a packet. From step 800 the process proceeds to step 802, where the adapter, or, more specifically, the adapter's control logic, determines whether a pause request has been received from a downstream adapter. If the adapter determines that it has not received a pause request from a downstream adapter, the process proceeds to step 804 where the adapter determines whether it needs to send a "local" packet, that is, a packet from the device which the adapter serves to attach to the network. Such as packet would typically be stored within a send buffer, as described above. If the adapter does not have any local packets to send, the process proceeds to step 806 where the adapter sends a bypass packet, that is, a packet from its bypass buffer, if one is available to be sent. Alternatively, the adapter may send an IDLE packet. From step 806 the process proceeds to step 808, where the adapter stores its current status, i.e., Donor, Head of a fused bypass, or Member of a fused bypass. After storing its current status, the process proceeds to END in step 810.

If, in step 804, the adapter determines that it needs to send a local packet, the process proceeds from step 804 to step 812, where the adapter determines, through its control logic, whether there is room in the adapter's bypass buffer to store the local packet that is to be. In the case of a donor, this only needs to be enough available storage to store a packet of the same length as the local packet that is to be sent. In the case of a head, the bypass buffer is, illustratively, emptied to permit sending. As noted above, although the local packet will not be stored within the bypass buffer, the presence of sufficient room in the bypass buffer to store the local packet which is to be sent provides a convenient indication that the bypass buffer will not overflow if no packets are forwarded from the bypass buffer during the time the adapter sends a packet from its local send buffer. This assumes that packets arrive in the bypass buffer at the same rate as local packets are transmitted. If packets arrive and depart at different rates, the threshold level of available storage within the bypass buffer may be adjusted proportionately.

If the adapter determines in step 812 that there is not sufficient storage available within its bypass buffer, the process proceeds to step 814, where the adapter attempts to shut off the flow of packets into its bypass buffer by asserting pause. In the illustrative embodiment this is accomplished by the adapter's transmission of an IDLE packet having its pause flag asserted along the sense ring to the adapter's upstream neighbor. After asserting pause, the illustrative process proceeds from step 814 to step 816 where the adapter sends a packet from its bypass buffer. From step 816 the process proceeds to step 808 and from there as previously described.

If, in step 812, the adapter determines that it has sufficient room in its bypass buffer to permit the transmission of a local packet, the process proceeds from step 812 to step 818, where the adapter sends a packet from its send buffer. From step 818 the process proceeds to step 808 and, from there, as previously described.

Returning to step 802, if the adapter determines that it has received a pause request, that is, if pause has been asserted to it by a downstream neighbor, the process proceeds from step 802 to step 820 where the adapter determines whether it had asserted pause at the time it sent its previous packet. If the adapter had not asserted pause at the time it transmitted its previous packet, the adapter must have been a donor adapter at that time. Consequently, when, in step 822, the adapter determines whether its bypass buffer is full, it is determines whether it will become a member adapter of a fused bypass. That is, if the adapter determines in step 822 that its bypass buffer is full, the adapter proceeds to step 824, where it asserts pause to its upstream neighbor and proceeds to step 826, where it transmits a packet from its bypass buffer along the network's data ring. From step 826 the process proceeds to step 808 and from there as previously described. If, in step 822, the adapter determines that its bypass buffer is not full, it retains its status as a donor adapter and proceeds to step 828 where it transmits an IDLE packet to its downstream neighbor along the network's data ring. From step 828 the process proceeds to step 808, and from there as previously described.

Returning to step 820, should the adapter determine that it had asserted pause at the end of its previous packet transmission, the adapter is either the HEAD or a MEMBER of a fused bypass and it proceeds to step 830 where it determines whether it is the HEAD of a fused bypass. If the adapter is not the HEAD of a fused bypass, the process proceeds from step 830 to step 832, where the adapter asserts pause. From step 832 the process proceeds to step 834, where the adapter transmits a packet from its bypass buffer. From step 834, the process proceeds to step 808, and from there as previously described.

If the adapter determines in step 830 that it is the HEAD of a fused bypass by checking the status it stored in step 808 of its previous pass, for example, the process proceeds to step 836 where the adapter determines whether its bypass buffer is empty and, if it is, the adapter proceeds to step 832 and from there as previously described. On the other hand, if the adapter determines in step 836 that its bypass buffer is empty, that indicates that all the bypass buffers within the fused bypass have emptied and that the fused bypass may be disassembled. Consequently, the process proceeds from step 836 to step 838 where the adapter de-asserts pause. From step 838, the process proceeds to step 840 where the adapter transmits a packet from its local buffer.

A software implementation of the above-described embodiment may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. These, and other straightforward modifications to the inventive concept are intended to be covered by the appended claims.

What is claimed is:

1. A method of providing access to a network for a network adapter, the network adapter including control logic and a bypass buffer, comprising the steps of:
   (A) determining whether a pause request has been received from a downstream network adapter,
   (B) determining whether there is room available within the adapter's bypass buffer to accommodate an incoming data packet from the network while a local packet is being sent, and
   (C) sending a local data packet to the network if there is sufficient room available within the bypass buffer to accommodate an incoming data packet from the network and no pause request has been received and there is a local packet to be sent and further including the steps of:
      (C1) sending a bypass data packet to the network if there is not sufficient room available within the bypass buffer to accommodate an incoming data packet from the network,
      (C2) sending a pause request packet to an upstream network adapter if there is not sufficient room within the bypass buffer to accommodate an incoming data packet from the network,
      (C3) sending data packets from the bypass buffer over the network to downstream adapters until the bypass buffer is emptied to a threshold level, then
      (C4) sending a data packet over the network which de-asserts the pause request to an upstream network adapter and sending a local data packet over the network to a downstream network adapter.

2. The method of claim 1 further comprising the step of:
   (D) an adapter storing status information whenever it asserts or de-asserts a pause request.

3. A computer program product for providing access to a computer network, the computer program product comprising a computer usable medium having computer readable program code written thereon, the program code comprising:
   program code for determining whether a pause request has been received,
   program code for determining whether there is room available within an adapter's bypass buffer to accommodate an incoming data packet while a local packet is being sent,
   program code for sending a local data packet if there is sufficient room available within the bypass buffer to accommodate an incoming data packet and no pause request has been received and there is a local packet to be sent,
   program code for determining whether there is room available within the bypass buffer to store a data packet having a length at least equal to a length of the local data packet to be sent,
   program code for sending a bypass data packet if there is not sufficient room available within the bypass buffer to accommodate an incoming data packet,
   program code for sending a pause request packet to an upstream network adapter if there is not sufficient room within the bypass buffer to accommodate an incoming data packet, and program code for sending data packets from the bypass buffer to downstream adapters until the bypass buffer is emptied to a threshold level, then sending a data packet which de-asserts the pause request to an upstream network adapter and sending a local data packet to a downstream network adapter.

4. The computer program product of claim 3 further comprising program code for storing an adapter's status information whenever it asserts or de-asserts a pause request.

5. The computer program product of claim 4 further comprising program code for sending IDLE packets to a downstream adapter in response to the receipt of a pause request from the downstream adapter.

6. The computer program product of claim 5 further comprising program code for storing an adapter's status information whenever the adapter responds to a pause request.

7. The computer program product of claim 6 further comprising program code for sending data from an adapter's bypass buffer and requesting pause from an upstream adapter in response to a request for a pause from a downstream adapter whenever the adapter's bypass buffer is filled to a threshold level.

8. An arbitration method for use in a packetized ring network wherein devices are connected to the network by adapters, each adapter including a bypass buffer that receives incoming packets, stores a predetermined amount of incoming data and discards idle packets and a transmitter that removes data packets from the bypass buffer and transmits to the network the removed data packets, new data packets generated by the connected device and idle packets, and wherein data packets flow from a first upstream adapter through the bypass buffer in a second adapter to a third downstream adapter and arbitration signals pass from the third downstream adapter to the first upstream adapter, the method comprising:

(A) receiving at the second adapter a first pause arbitration signal from the third downstream adapter;

(B) stopping the removal and transmission of data packets from the bypass buffer in the second adapter and transmitting idle packets to the third downstream adapter, if the bypass buffer is not full of data when the first pause arbitration signal is received; and (C) continuing the removal and transmission of data packets from the bypass buffer in the second adapter and sending a second pause request to the first upstream adapter, if the bypass buffer is full of data when the first pause arbitration signal is received.

9. The method of claim 8 further comprising:

(D) when the first pause arbitration signal is received, discontinuing the transmission of new data packets from the second adapter to the network.

10. The method of claim 8 wherein step (B) comprises:

(B1) continuing the removal and transmission of data packets from the bypass buffer in the second adapter to the third downstream adapter and sending a second pause arbitration signal to the first upstream adapter if the bypass buffer becomes full while the first pause arbitration signal is present.

11. The method of claim 8 further comprising:

(E) when the first pause arbitration signal is removed, continuing the transmission of new data packets and data packets removed from the bypass buffer in the second adapter to the network.

12. The method of claim 8 wherein step (A) comprises generating the first pause arbitration signal in the third downstream adapter when a bypass buffer in the third downstream adapter becomes full.

13. The method of claim 8 further comprising (F) removing the first pause arbitration signal in the third downstream adapter when a bypass buffer in the third downstream adapter becomes empty.

14. The method of claim 13 wherein step (F) further comprises:

(F1) sending new data packets from the third downstream adapter before removing the first pause arbitration signal.

15. The method of claim 13 further comprising (G) removing the second pause arbitration signal in the second adapter when the first pause arbitration signal is removed.

16. The method of claim 8 wherein each adapter further includes a stripper that removes incoming data packets before the incoming data packets enter the bypass buffer and substitutes idle packets therefore and wherein the method further comprises (H) stopping selected data packets at the second adapter.

17. The method of claim 8 wherein the first and second pause arbitration signals are modified idle packets.

18. Arbitration apparatus for use in a packetized ring network wherein devices are connected to the network by adapters, each adapter including a bypass buffer that receives incoming packets, stores a predetermined amount of incoming data and discards idle packets and a transmitter that removes data packets from the bypass buffer and transmits to the network the removed data packets, new data packets generated by the connected device and idle packets, and wherein data packets flow from a first upstream adapter through the bypass buffer in a second adapter to a third downstream adapter and arbitration signals pass from the third downstream adapter to the first upstream adapter, the apparatus comprising:

a receiver that receives at the second adapter a first pause arbitration signal from the third downstream adapter;

a control unit that stops the removal and transmission of data packets from the bypass buffer in the second adapter and transmits idle packets to the third downstream adapter, if the bypass buffer is not full of data when the first pause arbitration signal is received and continues the removal and transmission of data packets from the bypass buffer in the second adapter and sends a second pause request to the first upstream adapter, if the bypass buffer is full of data when the first pause arbitration signal is received.

19. The apparatus of claim 18 further comprising a transmitter that discontinues the transmission of new data packets from the second adapter to the network when the first pause arbitration signal is received.

20. The apparatus of claim 18 wherein the control unit comprises a mechanism that continues the removal and transmission of data packets from the bypass buffer in the second adapter to the third downstream and sends a second pause arbitration signal to the first upstream adapter if the bypass buffer becomes full adapter while the first pause arbitration signal is present.

21. The apparatus of claim 18 further comprising a transmitter that continues the transmission of new data packets and data packets removed from the bypass buffer in the second adapter to the network when the first pause arbitration signal is removed.

22. The apparatus of claim 18 wherein a transmitter in the third downstream adapter generates the first pause arbitration signal when a bypass buffer in the third downstream adapter becomes full.

23. The apparatus of claim 18 further comprising a mechanism in the third downstream adapter that removes the first pause arbitration signal when a bypass buffer in the third downstream adapter becomes empty.

24. The apparatus of claim 23 wherein the third downstream adapter comprises a transmitter that sends new data packets from the third downstream adapter before removing the first pause arbitration signal.

25. The apparatus of claim 23 wherein the control unit removes the second pause arbitration signal in the second adapter when the first pause arbitration signal is removed.

26. The apparatus of claim 18 wherein each adapter further comprises a stripper that removes incoming data packets before the incoming data packets enter the bypass buffer and substitutes idle packets therefore.

27. The apparatus of claim 18 wherein the first and second pause arbitration signals are modified idle packets.

28. A computer program product use in a packetized ring network wherein devices are connected to the network by adapters, each adapter including a bypass buffer that receives incoming packets, stores a predetermined amount of incoming data and discards idle packets and a transmitter that removes data packets from the bypass buffer and transmits to the network the removed data packets, new data packets generated by the connected device and idle packets, and wherein data packets flow from a first upstream adapter through the bypass buffer in a second adapter to a third downstream adapter and arbitration signals pass from the third downstream adapter to the first upstream adapter, the computer program product comprising a computer usable medium having computer readable program code written thereon, the program code comprising:

program code that receives at the second adapter a first pause arbitration signal from the third downstream adapter;

program code that stops the removal and transmission of data packets from the bypass buffer in the second adapter and transmits idle packets to the third downstream adapter, if the bypass buffer is not full of data when the first pause arbitration signal is received; and program code that continues the removal and transmission of data packets from the bypass buffer in the second adapter and sending a second pause request to the first upstream adapter, if the bypass buffer is full of data when the first pause arbitration signal is received.

29. The computer program product of claim 28 wherein that program code that stops the removal and transmission of data packets from the bypass buffer comprises program code that continues the removal and transmission of data packets from the bypass buffer in the second adapter to the third downstream adapter and sends a second pause arbitration signal to the first upstream adapter if the bypass buffer becomes full while the first pause arbitration signal is present.

* * * * *

UNITED STATES PATENT AND TRADEMARK OFFICE
CERTIFICATE OF CORRECTION

PATENT NO.    : 6,529,518 B1
DATED         : March 4, 2003
INVENTOR(S)   : Thomas P. Webber It is certified that error appears in the above-identified patent and that said Letters Patent is hereby corrected as shown below:

<u>Column 14,</u>
Line 19, please change from "comprises (H) stopping selected" to -- comprises (H) stripping selected --.

Signed and Sealed this

Twelfth Day of August, 2003

JAMES E. ROGAN
*Director of the United States Patent and Trademark Office*